(12) United States Patent
Levy et al.

(10) Patent No.: US 6,386,524 B1
(45) Date of Patent: May 14, 2002

(54) PEDESTAL MOUNTED FULL RESERVOIR AIR SPRING PISTON

(75) Inventors: Daniel I. Levy, Waltham Abbey (GB); Pradipta N. Moulik, Carmel, IN (US); Mohamad Taghizadeh, Indianapolis, IN (US); Daniel J. Leonard, Carmel, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 09/557,559

(22) Filed: Apr. 25, 2000

Related U.S. Application Data

(60) Provisional application No. 60/182,797, filed on Feb. 15, 2000.

(51) Int. Cl.⁷ .................................................. F16F 9/04
(52) U.S. Cl. .............................. 267/64.27; 267/64.21; 267/64.24
(58) Field of Search ............................. 267/122, 64.27, 267/64.24, 64.21, 64.23, 118, 140

(56) References Cited

U.S. PATENT DOCUMENTS

| | | | | |
|---|---|---|---|---|
| 4,218,078 A | * | 8/1980 | Lee ............................. 285/115 |
| 4,564,177 A | | 1/1986 | Leonard ..................... 267/64.24 |
| 4,650,166 A | | 3/1987 | Warmuth ................... 267/64.27 |
| 4,787,606 A | | 11/1988 | Geno et al. ................. 267/64.27 |
| 4,890,823 A | | 1/1990 | Koschinat et al. ......... 267/64.27 |
| 5,316,273 A | | 5/1994 | Vaphiadis |
| 5,326,082 A | | 7/1994 | Ecktman et al. ........... 267/64.27 |
| 5,342,139 A | | 8/1994 | Hoffman .................... 403/405.1 |
| 5,382,006 A | | 1/1995 | Arnold ....................... 267/64.27 |
| 5,535,994 A | | 7/1996 | Safreed, Jr. ................ 267/64.27 |
| 5,707,045 A | | 1/1998 | Easter ........................ 267/64.21 |
| 5,752,692 A | | 5/1998 | Crabtree et al. ........... 267/64.24 |
| 5,934,652 A | * | 8/1999 | Hofacre et al. ............ 267/64.27 |
| 5,954,316 A | * | 9/1999 | Voss ........................... 267/64.27 |
| 6,113,081 A | * | 9/2000 | Hilburger et al. .......... 267/64.27 |

FOREIGN PATENT DOCUMENTS

| | | |
|---|---|---|
| DE | 4213676 A1 | 10/1993 |
| DE | 4230249 A1 | 3/1994 |
| DE | 29616257 U1 | 12/1996 |
| DE | 19616476 A1 | 11/1997 |
| EP | 0160371 A1 | 11/1985 |
| EP | 0295392 A2 | 12/1988 |
| EP | 0296445 A2 | 12/1988 |
| EP | 0647795 A1 | 4/1995 |
| EP | 07238969 | 12/1995 |
| EP | 0914976 A1 | 5/1999 |
| WO | WO 00/70238 | 11/2000 |

* cited by examiner

*Primary Examiner*—Christopher P. Schwartz
*Assistant Examiner*—Mariano Sy
(74) *Attorney, Agent, or Firm*—Thomas R. Kingsbury; Michael Sand; John H. Hornickel

(57) ABSTRACT

An air spring has a piston formed of a high strength plastic material consisting of a main shell and a bottom end sealing plate extending between a pair of concentric inner and outer annular walls. A pair of internal auxiliary reservoirs or subchambers are formed within the piston and are in fluid communication with each other and with the main air chamber formed by a flexible bellows extending between the piston and an end plate. A plurality of radially extending reinforcing ribs extend between the inner and outer annular walls of the shell and a rigid central post. A central planar support surface having an area approximately 20% than that of the piston base area provides a reduced surface area for mounting the piston on a smaller support surface.

10 Claims, 4 Drawing Sheets

PEDESTAL MOUNTED FULL RESERVOIR AIR SPRING PISTON

CROSS REFERENCE TO RELATED APPLICATION

This application claims the benefit of U.S. Provisional Patent Application Ser. No. 60/182,797, filed Feb. 15, 2000.

BACKGROUND OF THE INVENTION

1. Technical Field

The present invention relates to air springs and in particular to the piston member thereof. The piston is formed of a plastic material and has two separate internal air reservoirs to increase the air volume within the air spring and has a minimal support surface for mounting the air spring on a supporting structure.

2. Background Information

Air actuators and in particular air springs, consist of a pair of spaced end members and an intervening flexible sleeve or bellows which forms an internal pressurized fluid chamber. These devices are used for many applications, such as mounting between spaced components of a vehicle for absorbing road shock, supporting parts of machines and equipment, such as presses on which shock forces are continually imparted, and for regulating and maintaining the spacing between two spaced components of various types of equipment. These air springs assume various configurations depending upon their particular applications. Such air springs usually consist of an end member such as an end cap, with an other end member being a piston. The piston will have a designed outer surface over which a rolling lobe of the flexible sleeve moves for affecting the damping of the vehicle or equipment on which the air spring is mounted. Prior art air springs and in particular the pistons thereof, are usually fabricated from steel thereby increasing weight, cost and presenting corrosion problems. Also, it is desirable to increase the internal volume or air space within the air spring without materially increasing the size of the air spring to provide greater flexibility in achieving ride softness by effecting the rate of the air spring as well as lowering the natural frequency which will improve the air spring vibration isolation capability.

Another problem with existing air springs is that the bottom of the piston requires a large surface area for mounting on one of the spaced components of a vehicle or equipment, which space is not readily available or is unattainable for certain applications.

U.S. Pat. No. 4,564,177 describes an air spring having a plastic piston which provides a very small upper hollow portion functioning as an auxiliary reservoir. However, the piston requires a large surface area for mounting it on the supporting structure.

U.S. Pat. No. 4,650,166 discloses a two-piece piston which forms an auxiliary reservoir but requires a full sized base for supporting the piston on a support structure.

U.S. Pat. No. 4,787,606 discloses a plastic piston for an air spring formed of two separate members which when connected together form two chambers, but the chambers are not utilized as auxiliary reservoir chambers for receiving pressurized air. Likewise, the mounting base extends throughout the entire width of the piston.

U.S. Pat. No. 4,890,823 is believed to be the most pertinent piston to the subject invention in that it discloses a two-piece plastic piston. However, the base is not utilized to form the auxiliary reservoir as is that of the present invention, and the lower mounting surface or base is equal to the entire circumference of the piston base.

U.S. Pat. No. 5,326,082 discloses a plastic piston having an auxiliary reservoir in the central portion thereof. However, it requires a large mounting surface or base for mounting the piston on a support structure.

U.S. Pat. No. 5,342,139 discloses a plastic piston which again requires a large mounting base or surface for supporting the piston on a vehicle component.

U.S. Pat. No. 5,382,006 discloses a piston formed of metal which does provide an auxiliary reservoir. However, the mounting surface of the piston base extends completely throughout the circumference of the piston, and thus requires a large mounting surface on the supporting structure.

U.S. Pat. No. 5,707,045 discloses a plastic piston for an air spring having an auxiliary reservoir. Again, the supporting area of the base extends throughout the entire circumference of the piston.

U.S. Pat. No. 5,752,692 discloses a plastic piston having a hollow interior which forms an auxiliary reservoir with the pressure chamber of the bellows. However, the piston is mounted on an air strut and thus is not concerned with a base for mounting it on a supporting structure such as on a vehicle.

SUMMARY OF THE INVENTION

The present invention provides a piston for an air spring which is formed of a lightweight, high strength plastic material which enables the internal volume of the air spring to be increased considerably without materially affecting the size of the air spring to affect the rate of the air spring, thereby lowering its natural frequency to improve its vibration isolation capability.

The air spring piston of the invention is provided with a pair of internal subchambers connected by fluid passageways, which subchambers communicate fluidly with the main fluid chamber of the flexible sleeve, without sacrificing the structural integrity and strength of the piston by providing a plurality of radially extending reinforcing ribs within both of the subchambers.

Another aspect of the invention provides a reduced central base area which provides an outwardly extending end surface or pedestal in order to support the air spring assembly on a relatively small surface area.

Another feature of the invention is forming the piston of a thermoplastic material which reduces the weight and cost, yet which provides increased internal volume and reduced mounting surface area.

A further feature of the invention is forming the air spring piston of two components, a main shell and a separate base, which components can be easily joined using readily available welding techniques, adhesives or various fastening devices.

Another aspect of the invention is to provide a variety of internal strengthening ribs to enable the piston to withstand the application loads and pressure without materially increasing the size and weight of the piston.

The foregoing advantages, construction and operation of the present invention will become more readily apparent from the following description and accompanying drawings.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
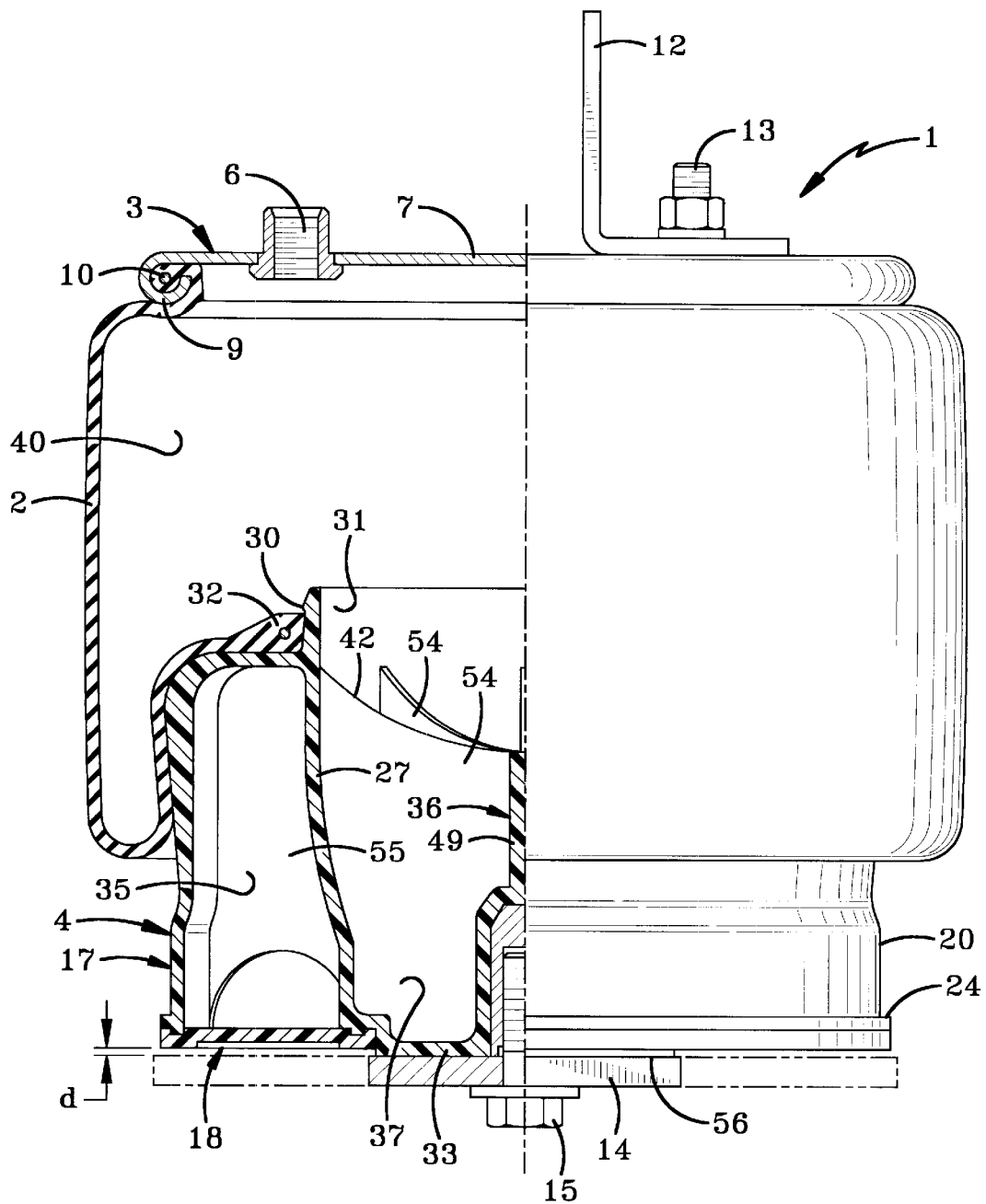
FIG. 1 is a side elevational view of an air spring having the improved full reservoir plastic piston incorporated therein, one half of which is in section.
Figure 2:
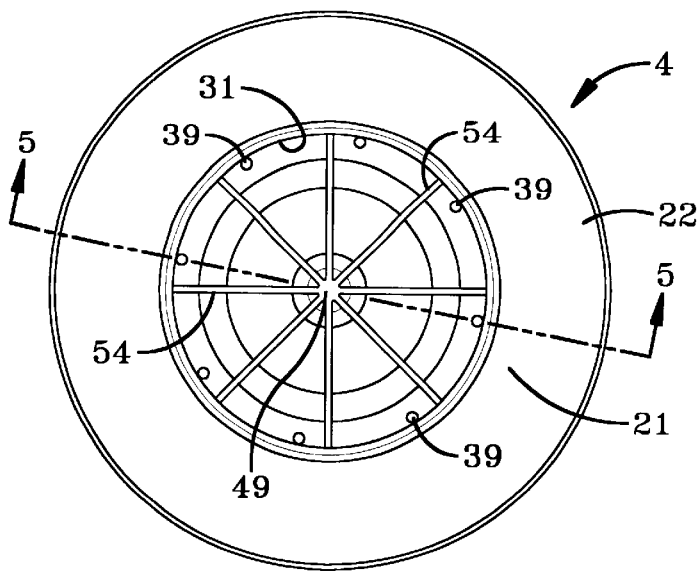
FIG. 2 is a reduced top plan view of the piston shown in FIG. 1 removed from the air spring.
Figure 3:
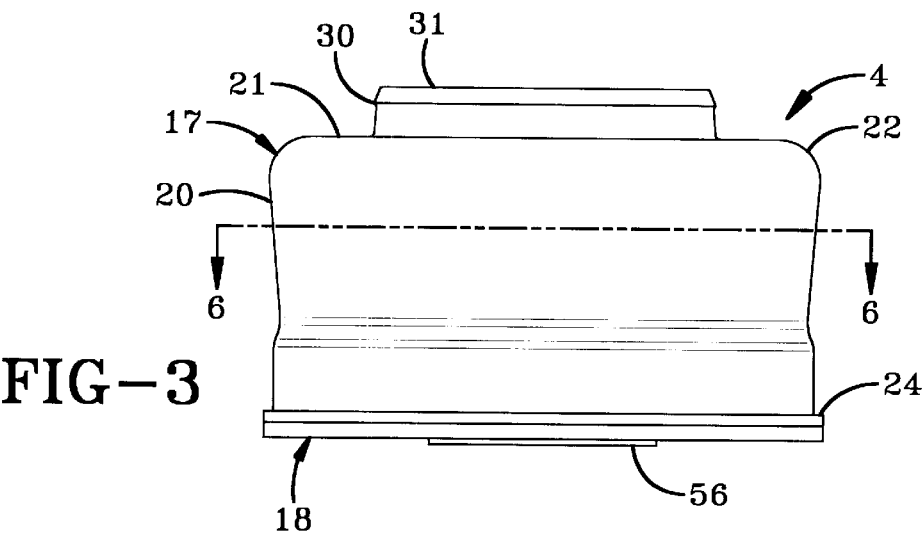
FIG. 3 is a side elevational view of FIG. 2.
Figure 4:
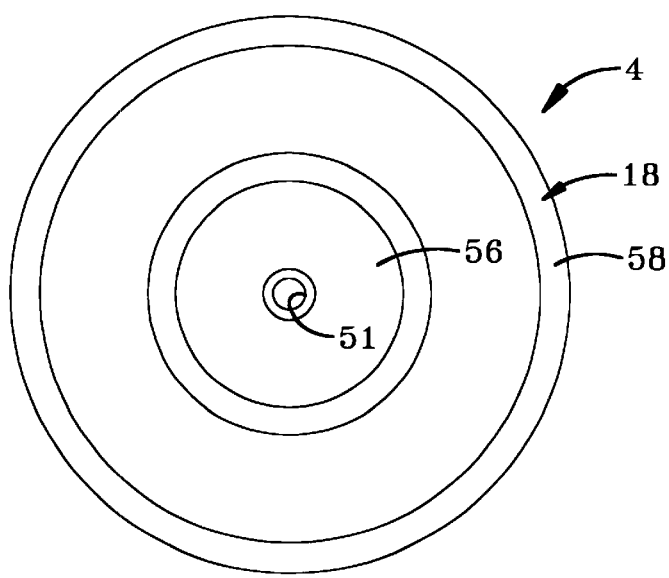
FIG. 4 is a bottom plan view of FIG. 2.

An air spring indicated generally at 1, is shown in FIG. 1 having a flexible open ended sleeve or bellows 2 extending between an upper end plate 3 and the unique piston 4 of the present invention. End plate 3 is of a usual metal construction and preferably has an air passage 6 formed in a top wall 7 thereof. Plate 3 terminates in a peripheral rolled flange 9 which clamps about a bead area 10 of bellows 2 to provide a fluid tight seal therebetween. A bracket 12 or similar attachment device may be secured to wall 7 by a fastener 13 for securing the end plate or upper end of the air spring to a spaced structure of a vehicle or other type of equipment. Piston 4 is mounted on a support member 14 axially spaced from top wall 7 of end plate 3 by a bolt 15 or other attachment devices as described further below.

Figure 5:
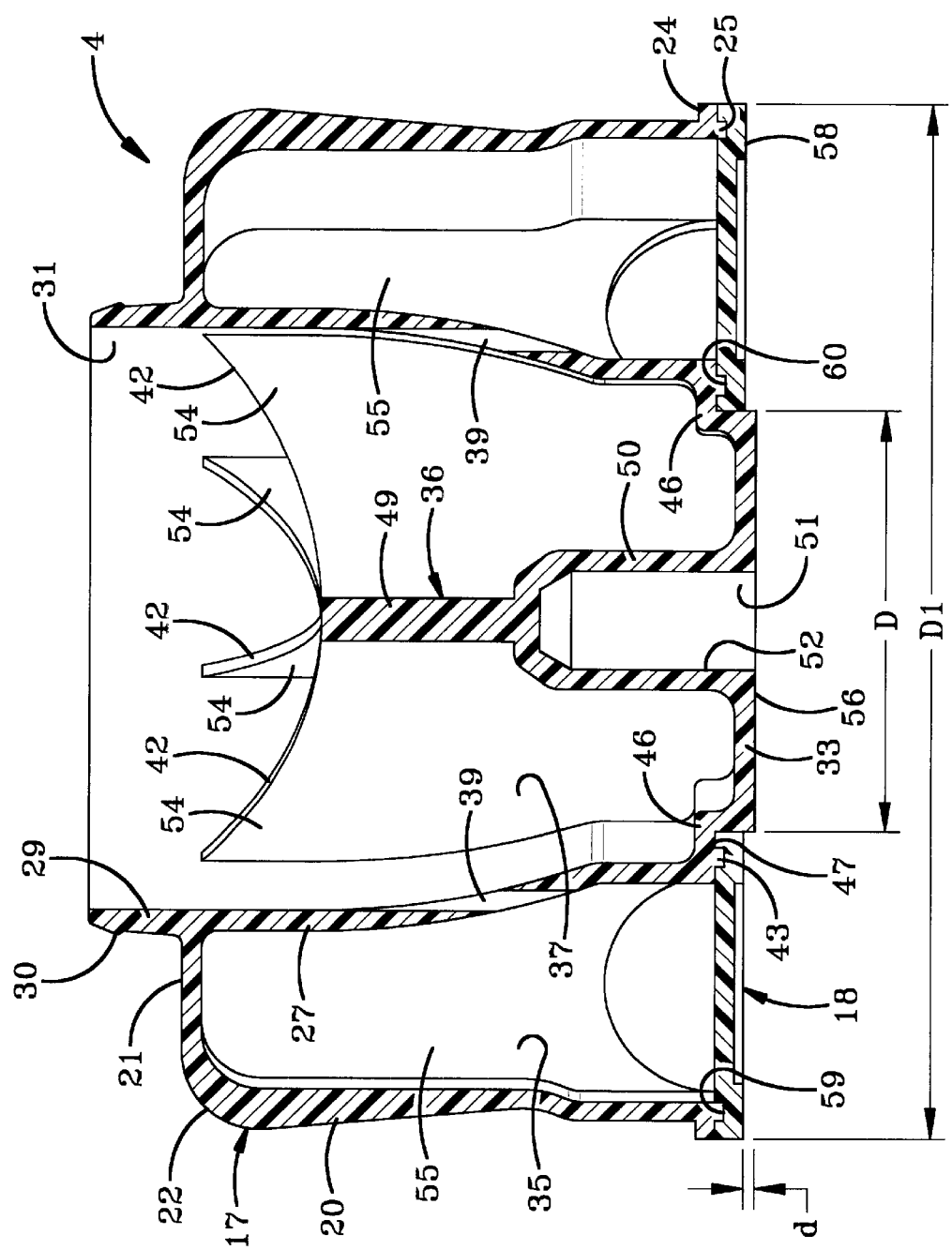
FIG. 5 is an enlarged sectional view taken on line 5—5, FIG. 2.
Figure 6:
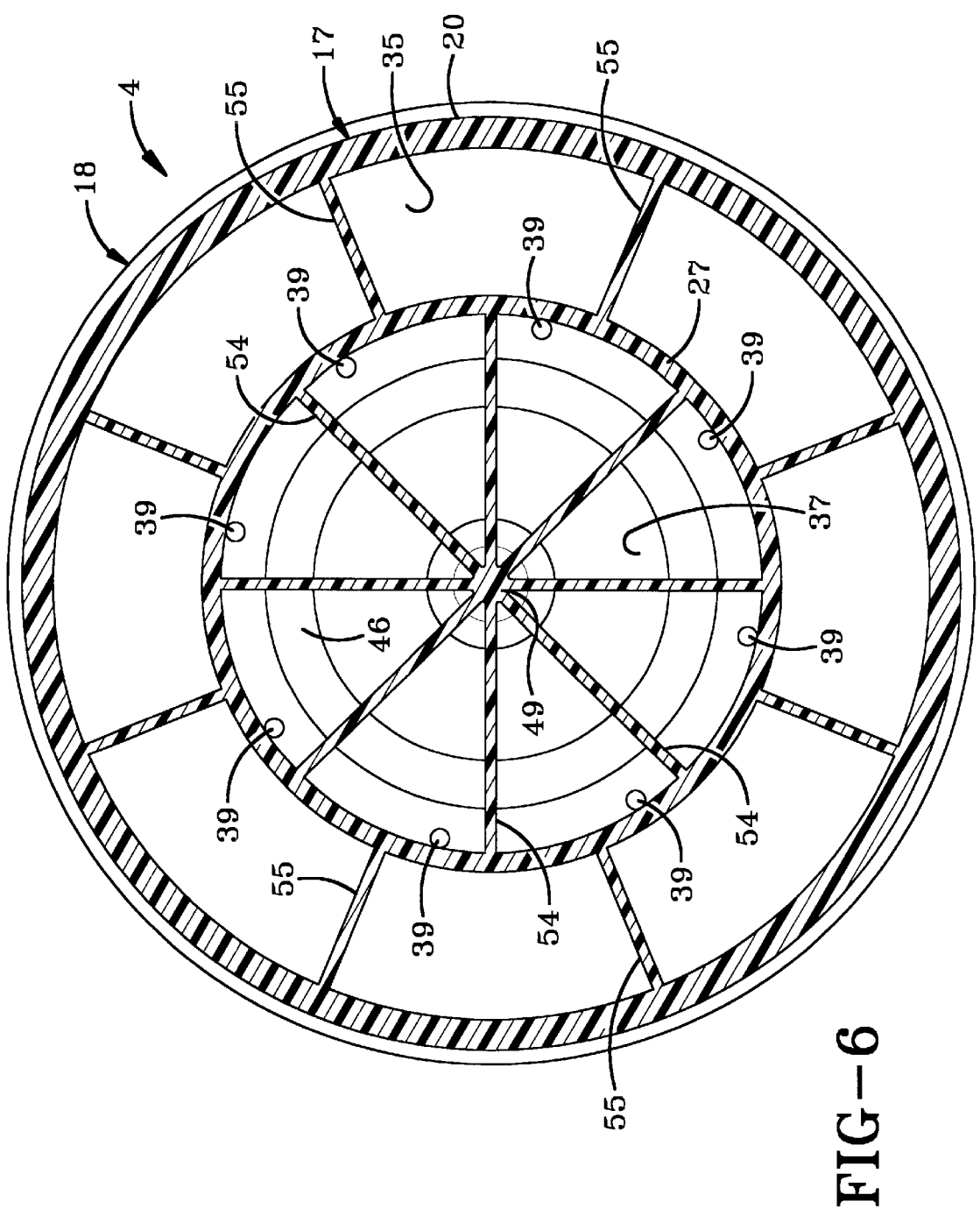
FIG. 6 is an enlarged sectional view taken on line 6—6, FIG. 3.

The improved piston 4 of the present invention is shown in detail in FIGS. 2–6. Referring particularly to FIG. 5, piston 4 includes two components, a main shell indicated generally at 17, and a bottom end sealing plate indicated generally at 18, both of which preferably are formed of a high strength thermoplastic material. Main shell 17 includes an outer annular sidewall 20 terminating in a planar top wall 21 integrally connected thereto by an annular shoulder 22. Sidewall 20 terminates at its lower end in a peripheral flange 24 formed with an annular rib 25.

Shell 17 further includes an inner annular wall 27 which terminates in an open upper end 31 defined by a cylindrical wall 29 preferably formed with an outer circumferential projection 30. Wall 29 provides an annular outer sealing surface against which a bead area 32 of sleeve 2 (FIG. 1) is secured between projection 30 and top wall 21. Inner wall 27 has an inwardly curved bowl-like configuration and terminates in a bottom end closure wall 33. Outerwall 20 and top wall 21 together with inner wall 27 and bottom sealing plate 18, form a first subchamber or outer auxiliary reservoir 35. A second subchamber or inner auxiliary reservoir 37 is formed by wall 27, bottom end wall 33 and a central post 36. Inner reservoir 37 communicates with outer reservoir 35 through a plurality of air passageways 39 formed in wall 27 and with the main pressure reservoir or chamber 40 formed of bellows 2, through top opening 31.

A plurality of radially extending ribs 54 extend between inner wall 27 and central post 36, and preferably are formed integrally with bottom wall 33. Ribs 54 preferably have a curved top edge 42. Bottom end wall 33 has an annular disk-like configuration and is formed integrally with and connects to inner wall 27 by an annular stepped shoulder 46 which is formed with an annular notch or groove 47 located adjacent an annular rib 43. Post 36 includes a cylindrical solid upper core 49 and a hollow dome-shaped base 50 which is formed with a cylindrical hole or opening 51. Inner surface 52 of opening 51 may be threaded for receiving bolt 15 as shown in FIG. 1, or could have a roughened surface for adhesively securing a fastener therein, or adapted to receive other types of mounting devices such as bolts, screws, etc. A second plurality of reinforcing ribs 55 extend radially between inner wall 27 and outer wall 20 and may connect to a portion of top wall 21 to provide strength to inner wall 27, and outer wall 20 and top wall 21.

In accordance with one of the features of the invention, bottom end wall 33 has a generally planar bottom surface 56 which extends below the bottom surface 58 of end plate 18, a distance "d" as shown in FIG. 5. This provides a pedestal mounting surface considerably reduced in size than that of end plate 18. Preferably the effective area defined by diameter D of end wall 33 will be a maximum of 20% the effective surface area defined by diameter D1 of sealing end plate 18 although this percentage may vary without effecting the concept of the invention. This provides a minimal support surface centrally located on piston 4, for mounting the piston on support structure 14. Thus, as can be seen on FIGS. 1 and 5, the effective bottom surface area of end plate 18 is considerably larger than the effective surface area, and in particular the diameter of support surface 56, thereby materially reducing the required size of support member 14. This is in contrast to the heretofore considerably larger support area shown by dot-dash lines in FIG. 1 heretofore required for securing the piston on a support structure. As shown in FIG. 5, bottom plate 18 is secured to main shell 17, preferably by two annular welds at the mating engagement of annular rib 25 in outer annular groove 59 and rib 43 in an inner annular groove 60 formed in end plate 18. However, plate 18 can be attached to shell 17 by an adhesive or mechanical fastener if desired.

Thus, piston 4 is formed of a lightweight corrosive resistant plastic material formed of two independent components, shell 17 and end plate 18, which are secured together by two annular welds, an adhesive or mechanical fastener, into a rigid structure having a pair of subchambers 35 and 37 connected by air passageways 39 extending therebetween. Passageways 39 can be produced when molding the shell or drilled as a secondary process. The internal strengthening ribs in both of the subchambers together with inner central post 36, provide an extremely rigid structure which is able to be supported with a minimal amount of surface area provided by flat planar surface 56 of bottom wall 33 of main shell 17.

While the embodiments of the invention have been described, the invention is not limited thereto but can have other modifications and derangements without affecting the concept of the invention.

What is claimed is:

1. A piston for attachment to a flexible sleeve of an air spring, said piston including:
   a one-piece integral main shell formed of plastic having inner and outer generally concentric annular walls forming a second subchamber within the inner wall and a first subchamber In an annular space formed between said inner and outer walls, at least said second subchamber being adapted to be In fluid communication with a main fluid chamber formed within the flexible sleeve; a plurality of stiffening ribs extending between said inner and outerwalls and located within said first subchamber, and between said inner wall within said second subchamber; a generally planar bottom end wall enclosing an open bottom of the inner annular wall;

a one-piece integral annular end closure plate formed of plastic extending between the outer and inner annular walls and sealingly connected thereto for enclosing the first subchamber, said bottom end wall extending beyond said end closure plate to provide a central pedestal having a reduced area than an area defined by said outer wall for mounting the piston on a supporting member;

a central post extending upwards from the bottom end wall into the second subchamber, with certain of the stiffening ribs extend radially between said central post and the inner wall;

a top wall extending between the outer and inner walls and forming a top closure for the first subchamber, with at least one opening being formed in the inner wall to provide fluid communication between said first and second subchambers; and an annular portion of the inner wall extending beyond the top wall and providing a sealing surface for engagement with a beaded area of the flexible sleeve.

2. The piston defined in claim 1 in which the mounting area of the pedestal defined by the inner wall is approximately 20% of the area defined by the outer wall.

3. An air spring including:

an end member adapted to be mounted to a first support structure;

a piston adapted to be mounted to a second support structure spaced from said first support structure;

a flexible sleeve extending between and sealingly connected to said end member and piston and forming a main fluid chamber therebetween for containing a pressurized fluid;

said piston including:

a main shell having outer and inner annular walls forming a second subchamber within said inner wall and a first subchamber between said inner and outer walls, at least said second subchamber being in fluid communication with the main fluid chamber;

an end wall forming an end closure for the second subchamber;

an end plate forming an end closure for the first subchamber, said end plate having a central opening with said end wall extending through said central opening and beyond said end plate to provide a support surface having a first area less than a second area defined by said end plate; and said inner and outer annular walls terminating in a pair of annular concentric ribs seated within spaced annular grooves formed adjacent inner and outer peripheries of the end plate for mounting the end plate to the main shell and enclosing the first subchamber.

4. The air spring defined in claim 3 in which at least one opening is forming in the inner wall of the main shell providing fluid communication between the first and second subchambers.

5. The air spring defined in claim 3 in which a plurality of stiffening ribs extend radially between a central post and the inner annular wall.

6. The air spring defined in claim 5 in which an end opening is formed in the post; and in which a fastener is adapted to extend into said opening for securing the piston on the second support structure.

7. The air spring defined in claim 5 in which the central post includes a solid end core and a hollow dome-shaped base.

8. The air spring defined in claim 3 in which the end wall has a diameter which defines an area approximately 20% of the second area defined by the end plate.

9. The air spring defined in claim 3 in which an open end of the inner wall projects beyond the planar wall of the main shell and provides an annular sealing surface; and in which an open end of the flexible sleeve is sealingly clamped against said sealing surface.

10. The air spring defined in claim 9 in which an annular projection extends outwardly from the annular sealing surface of the inner wall and engages a bead area surrounding the open end of the flexible sleeve.

* * * * *